(12) United States Patent
Mimura et al.

(10) Patent No.: US 11,431,876 B2
(45) Date of Patent: Aug. 30, 2022

(54) IMAGE INSPECTION DEVICE, IMAGE FORMING APPARATUS, AND IMAGE INSPECTION METHOD

(71) Applicant: Konica Minolta, Inc., Tokyo (JP)

(72) Inventors: Yusuke Mimura, Hino (JP); Makoto Oki, Hino (JP); Hiroaki Kodaira, Hino (JP)

(73) Assignee: Konica Minolta, Inc., Tokyo (JP)

(*) Notice: Subject to any disclaimer, the term of this patent is extended or adjusted under 35 U.S.C. 154(b) by 32 days.

(21) Appl. No.: 17/006,744

(22) Filed: Aug. 28, 2020

(65) Prior Publication Data

US 2021/0067659 A1 Mar. 4, 2021

(30) Foreign Application Priority Data

Aug. 30, 2019 (JP) .............................. JP2019-157762

(51) Int. Cl.
| | |
|---|---|
| *H04N 1/46* | (2006.01) |
| *H04N 1/58* | (2006.01) |
| *G06T 5/00* | (2006.01) |
| *G06T 7/00* | (2017.01) |
| *H04N 1/00* | (2006.01) |

(52) U.S. Cl.
CPC ............... *H04N 1/58* (2013.01); *G06T 5/002* (2013.01); *G06T 7/0002* (2013.01); *H04N 1/00411* (2013.01); *G06T 2207/10004* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 7,076,086 | B2* | 7/2006 | Miyake | H04N 1/00002 358/1.9 |
| 7,243,045 | B2* | 7/2007 | Uwatoko | G03G 15/55 399/9 |
| 2003/0076518 | A1* | 4/2003 | Miyake | H04N 1/00002 358/1.9 |
| 2005/0240376 | A1 | 10/2005 | Uwatoko et al. | |

(Continued)

FOREIGN PATENT DOCUMENTS

| | | |
|---|---|---|
| JP | 201455852 A | 3/2014 |
| JP | 2016206691 A | 12/2016 |

OTHER PUBLICATIONS

Extended European Search Report issued in the counterpart European Patent Application No. 20192541.9, dated Dec. 18, 2020 (9 pages).

(Continued)

*Primary Examiner* — Dung D Tran
(74) *Attorney, Agent, or Firm* — Osha Bergman Watanabe & Burton LLP

(57) ABSTRACT

An image inspection device detects an abnormality of a formed image by comparing imaged data obtained by imaging the formed image with original image data of the formed image. The image inspection device includes a hardware processor that: adjusts the original image data to reduce sharpness of the original image data; and detects the abnormality by comparing the adjusted original image data with the obtained imaged data. The hardware processor partly restricts the reduction of the sharpness.

15 Claims, 11 Drawing Sheets

(56) References Cited

U.S. PATENT DOCUMENTS

| | | | |
|---|---|---|---|
| 2011/0141526 A1* | 6/2011 | Kawamoto | H04N 1/40075 |
| | | | 358/3.06 |
| 2019/0149669 A1* | 5/2019 | Morita | G06T 7/001 |
| | | | 382/112 |
| 2019/0246005 A1 | 8/2019 | Fergen et al. | |
| 2020/0226718 A1* | 7/2020 | Reddy | G06T 5/50 |

OTHER PUBLICATIONS

First Office Action issued in corresponding Chinese Application No. 202010863536.1 dated Mar. 23, 2022 (17 pages).

\* cited by examiner

IMAGE INSPECTION DEVICE, IMAGE FORMING APPARATUS, AND IMAGE INSPECTION METHOD

CROSS-REFERENCE TO RELATED APPLICATIONS

The entire disclosure of Japanese Patent Application No. 2019-157762 filed on Aug. 30, 2019 is incorporated herein by reference.

BACKGROUND

Technical Field

The present disclosure relates to an image inspection device, an image forming apparatus, and an image inspection method.

Description of Related Art

A technique has been developed for detecting abnormalities in an image formed by an image forming apparatus. Specifically, the formed image is photographed (imaged) and compared with original image data of the formed image. In forming an image, color materials such as toner may not adhere to an area the shape of which is the same as pixels of the original image data. This results in a difference in shape between the formed image and the image in the original image data. Further, in imaging the formed image, the imaging result may not exactly reproduce the formed image depending on the resolution of the imaging and positions of recording for the pixels.

To deal with this, JP2014-55852A discloses a technique for reducing misdetections. The technique detects edges of density levels in original image data and uses, in determining inconsistent density levels, different thresholds for parts around the edges and the other parts. Further, according to JP2016-206691A, a threshold for a difference between imaged data and original image data is determined by regions into which a whole image region is divided.

However, the above techniques cannot appropriately determine whether or not an abnormality is present around thin lines and points where luminosity values change greatly and become extreme.

SUMMARY

One or more embodiments of the present invention provide an image inspection device, an image forming apparatus, and an image inspection method that can detect abnormalities in a formed image more appropriately.

According to one or more embodiments, there is provided an image inspection device that detects an abnormality of a formed image by comparing imaged data obtained by imaging the formed image and original image data of the formed image, the image inspection device including a hardware processor that:

adjusts the original image data so as to reduce sharpness of the original image data; and detects the abnormality by comparing the adjusted original image data and the imaged data, wherein the hardware processor is able to partly restrict the reduction of the sharpness.

According to one or more embodiments, there is provided an image inspection method for detecting an abnormality of a formed image by comparing imaged data obtained by imaging the formed image and original image data of the formed image, the image inspection method including:

adjusting the original image data so as to reduce sharpness of the original image data; and detecting the abnormality by comparing the adjusted original image data and the imaged data, wherein in the adjusting, the reduction of the sharpness is able to be partly restricted.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, embodiments of the present invention will be described with reference to the drawings. However, the scope of the invention is not limited to the disclosed embodiments.

Figure 1:
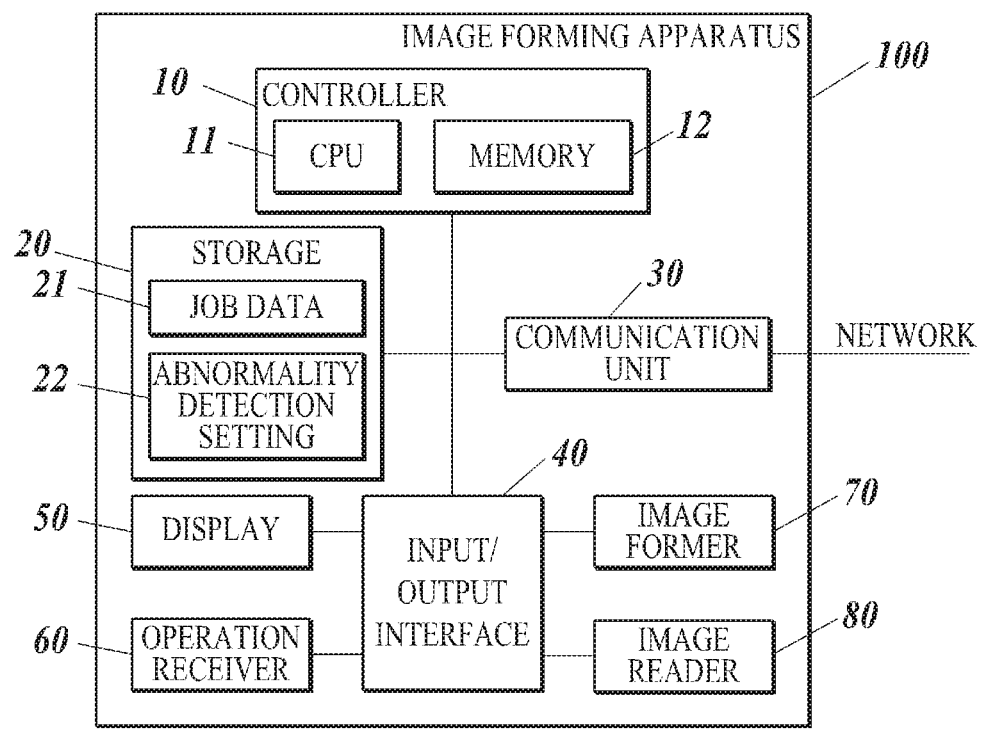
FIG. 1 is a block diagram showing a functional configuration of an image forming apparatus.

FIG. 1 is a block diagram showing a functional configuration of an image forming apparatus 100 that includes an image inspection device in one or more embodiments.

The image forming apparatus 100 is capable of performing image forming operation based on image data and image reading operation for reading (scanning) formed images. The image forming apparatus 100 includes a controller 10 (image inspection device including an adjuster and a detector), a storage 20, a communication unit 30, an input-output interface 40, a display 50, an operation receiver 60, an image former 70, and an image reader 80.

The controller 10 integrally controls the components of the image forming apparatus 100 and causes the components to perform various operations, such as image formation. The controller 10 includes a central processing unit (CPU, hardware processor) 11 and a memory 12.

The CPU 11 performs various arithmetic processes and executes controlling operation in accordance with programs and other instructions. The memory 12 includes a random access memory (RAM). The RAM provides the CPU 11 with a memory space for work and stores/maintains temporary data. The memory 12 may include a non-volatile memory, such as a flash memory, to store various programs and setting data. The controller 10 may share the RAM and the non-volatile memory with the storage 20.

The storage 20 stores various kinds of data. The storage 20 stores job data 21 and abnormality detection setting 22 for detecting abnormalities in formed images. The job data 21 may be stored in a volatile memory, such as a dynamic random-access memory (DRAM) that can process a large amount of data at a high speed. The abnormality detection setting 22 is stored in a non-volatile memory, such as a flash memory and a hard disk drive (HDD).

The job data 21 is data of image forming instructions (printing instructions) obtained from external apparatuses, for example. The job data 21 includes data of an image to be formed (original-image data of a formed image, hereinafter called object-image data) and setting data as to image forming operations. The setting data may include, for example, settings on the type and the direction of media on which images are formed, double-side printing, and the number of sheets on which images are formed. Images in image data may be any kind of images, for example, a color image formed of multiple color components, such as C, M, Y, and K.

The abnormality detection setting 22 is data that sets criteria for detecting abnormalities by comparing object-image data and data obtained by reading a formed image (formed-image data), as described below.

The communication unit 30 controls communication with external apparatuses through a network in accordance with a specific communication standard. The communication unit 30 may include, for example, a network card and be capable of communicating with computers as external apparatuses through a local area network (LAN).

The input-output interface (I/F) 40 includes a connection terminal(s) for connecting to various peripherals. The I/F 40 connects to a display 50, an operation receiver 60, an image former 70, am image reader 80, for example.

The display 50 includes a display screen and displays, for example, various statuses, guidance, and selection menus under the control of the controller 10. The display screen may be of any type, for example, a liquid crystal display. The display 50 may include a light-emitting diode (LED) in addition to or instead of the display screen.

The operation receiver 60 receives inputs, such as operations by a user, from outside. The operation receiver 60 includes, for example, a touchscreen. The touchscreen is superposed on the display screen of the display 50. The touchscreen corresponds with the display contents of the display 50 to identify contents of operations performed on the touchscreen. The operation receiver 60 may include pushing-button switches in addition to or instead of the touchscreen.

The image former 70 forms images based on object-image data included in the job data 21. The type of the image former 70 is not specifically limited. In one or more embodiments, the image former 70 is configured to form images electro-photographically on media supplied from a predetermined tray. The image former 70 is capable of forming color images by applying four color materials of C, M, Y, and K to media.

The image reader 80 images (takes photographs of) the images formed by the image former 70 on the media, thereby obtaining formed-image data (imaged data of the formed image). The image reader 80 includes, for example, a one-dimensional scanner that has image sensors arranged one-dimensionally in a direction crossing a direction in which the media are conveyed (conveying direction). The image reader 80 generates two-dimensional formed-image data by reading the media being conveyed with the image sensors. The image reader 80 locates along an ejection path onto which the media are ejected by the image former 70 so as to image the image-formed side(s) of the media. The image reader 80 may read a color image by imaging the color image with three wavelength ranges of R, G, and B (different wavelength ranges). On the other hand, in reading a monochrome image, such as an image of black letters formed on a white background, the image reader 80 may not read the image with all the wavelength ranges. In the inspection described below, images of one or more wavelength ranges may be used.

Next, operations for image inspection (image inspection method) performed by the image forming apparatus 100 in one or more embodiments are described.

The image forming apparatus 100 compares object-image data (original image data) and formed-image data to determine whether an image has been correctly formed as intended in the object-image data. In other words, the image forming apparatus 100 detects abnormalities. For example, in detecting stains on a medium, the image forming apparatus 100 determines whether or not the pixel value (luminosity value or gray scale) of each pixel in the formed-image data is lower than the pixel value of the corresponding pixel in the object-image data by a predetermined reference error range or more. In detecting lack of color materials applied on the medium, the image forming apparatus 100 determines whether or not the pixel value of each pixel in the formed-image data is higher than the pixel value of the corresponding pixel in the object-image data by a predetermined reference error range or more.

When the resolution of the object-image data is higher than the resolution of the formed-image data, the resolution of the object-image data may be converted to the resolution of the read formed-image data.

The area to which color materials (toner), which form an image, actually adhere (fix) in the formed image depends on various factors, such as the characteristics of image forming operations and media. Accordingly, the shape of the area differs from the shape of the corresponding pixels in the object image, which is depicted by the arrangement of rectangular pixels. In particular, luminosity values of the formed-image data change gradually around the borders, where luminosity values in the object-image data change greatly. Such a gradation part in the formed-image data, which is obtained by imaging the formed image, may have lower luminosity values than the corresponding luminosity values of the object-image data. The part may be determined as having stains. To deal with this, low-pass filtering (LPF) is applied to the object-image data (original image data) to reduce (lower) sharpness of the object image. In other words, high-frequency components consisting edges of the object image are reduced to blur the object image. The object image with blurred edges (modified image) reflects the characteristics of the image former 70 and media. The image forming apparatus 100 uses the modified image as a target of comparison to detect abnormalities. The sharpness of the object image may be reduced by other means. For example, the object image may be blurred by smoothing the image with a Gaussian filter or by reducing the resolution with the calculated moving average.

FIGS. 2A-2D exemplify comparison of the formed-image data and the object-image data.

Figure 2:
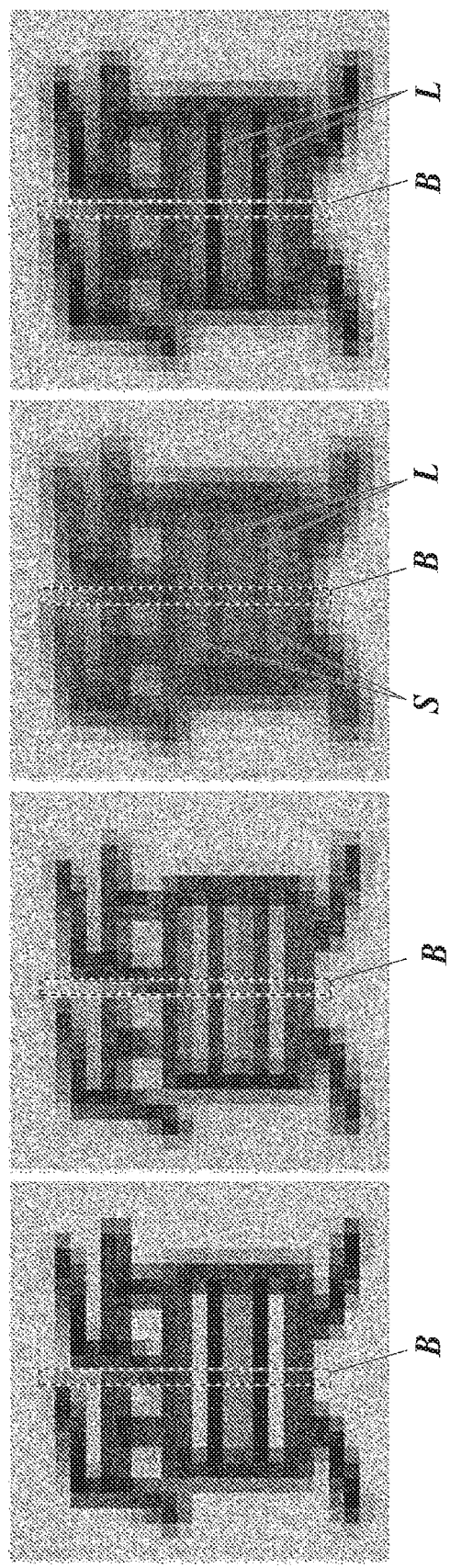
FIGS. 2A-2D exemplify comparison of formed-image data and object-image data.

FIG. 2A shows original object image. On the basis of the object image, an image is formed by the image former 70 and read by the image reader 80. FIG. 2B shows the result of reading the formed image. In the result of reading the formed image, the borders of the black portions showing the character tend to blur as compared with the original object image.

LPF is applied to the object-image data shown in FIG. 2A as described above. As FIG. 2C shows, the modified object-image data has largely increased luminosity values at the thin-line portion L, which has the width of one pixel or so, as a result of smoothing the luminosity values of the thin-line portion L and the surrounding pixels. As a result of this, the luminosity values of the thin-line portion L in the modified object-image data may be higher than the luminosity values of the correctly formed thin-line portion L in the formed-image data by a predetermined reference error range or more. The portion may be wrongly determined as having stains and being abnormal.

Figure 3:
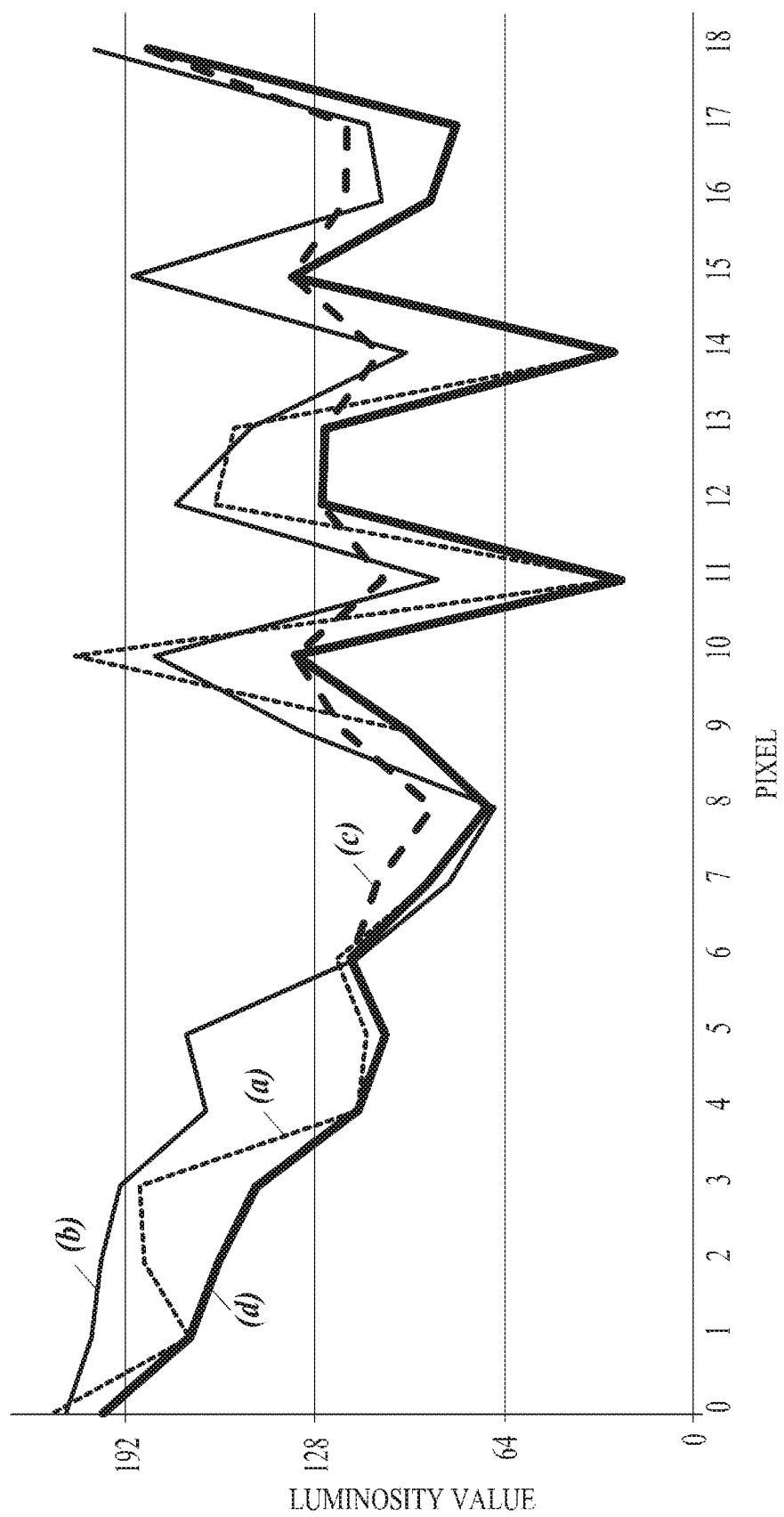
FIG. 3 shows distribution of luminosity values.

FIG. 3 shows distribution of luminosity values in the area B in FIGS. 2A-2D. The luminosity values are arranged in the order from the top to the bottom of the area B.

The density levels of the object-image data (a), which has high sharpness, greatly change at short intervals. On the other hand, the density levels of the modified object-image data (c), the high-frequency components of which have been reduced by LPF, are largely reduced and smoothed at the thin-line portions. As a result of this, the modified object-image data (c) has higher luminosity values than the formed-image data (b) at some portions, in particular the portions corresponding to horizontal black lines such as the pixels 11 and 14. Such reversals in luminosity values may affect the detection of stained portions (abnormally dark portions).

In modifying the object-image data, the image forming apparatus 100 in one or more embodiments partly restricts the reduction of sharpness of the object-image data. The parts of the object-image data where the reduction of sharpness is restricted include a part that becomes lighter after smoothing density levels with LPF and reducing sharpness. Firstly, the image forming apparatus 100 generates modified object-image data by applying LPF to the object-image data. The image forming apparatus 100 then compares the modified object-image data and the original object-image data on a pixel basis. Secondly, the image forming apparatus 100 undoes the modification of pixel values of pixels that have increased by a predetermined upper limit of change or more after smoothing density levels. In other words, as FIG. 2D and FIG. 3 show, thin black line portions do not lose their density levels after the smoothing, whereas the surrounding portions (mainly white portions in the upper and lower region of the image) maintain their smoothed density levels. The upper limit of change may be determined for each of the R, G, and B colors, or may be determined for a parameter into which R, G, and B values are integrated or converted (for example, brightness value).

On the other hand, a partial loss of the formed image (abnormally light portion) is also detected. As shown in FIG. 2C and FIG. 3, luminosity values of portions S between the thin black lines are greatly reduced in the LPF-applied image and are smaller than the luminosity values of the corresponding portions in the formed-image data. Such portions may be wrongly detected as being abnormal. To avoid this, the change of pixel values by LPF in the object-image data (original image data) may be undone (partly restricted). The parts where the change of pixel values is undone include a part that becomes darker as a result of reducing sharpness. More specifically, how to restrict the reduction of sharpness (areas and criteria of restriction) may be determined according to kinds of abnormalities to be detected.

Figure 4:
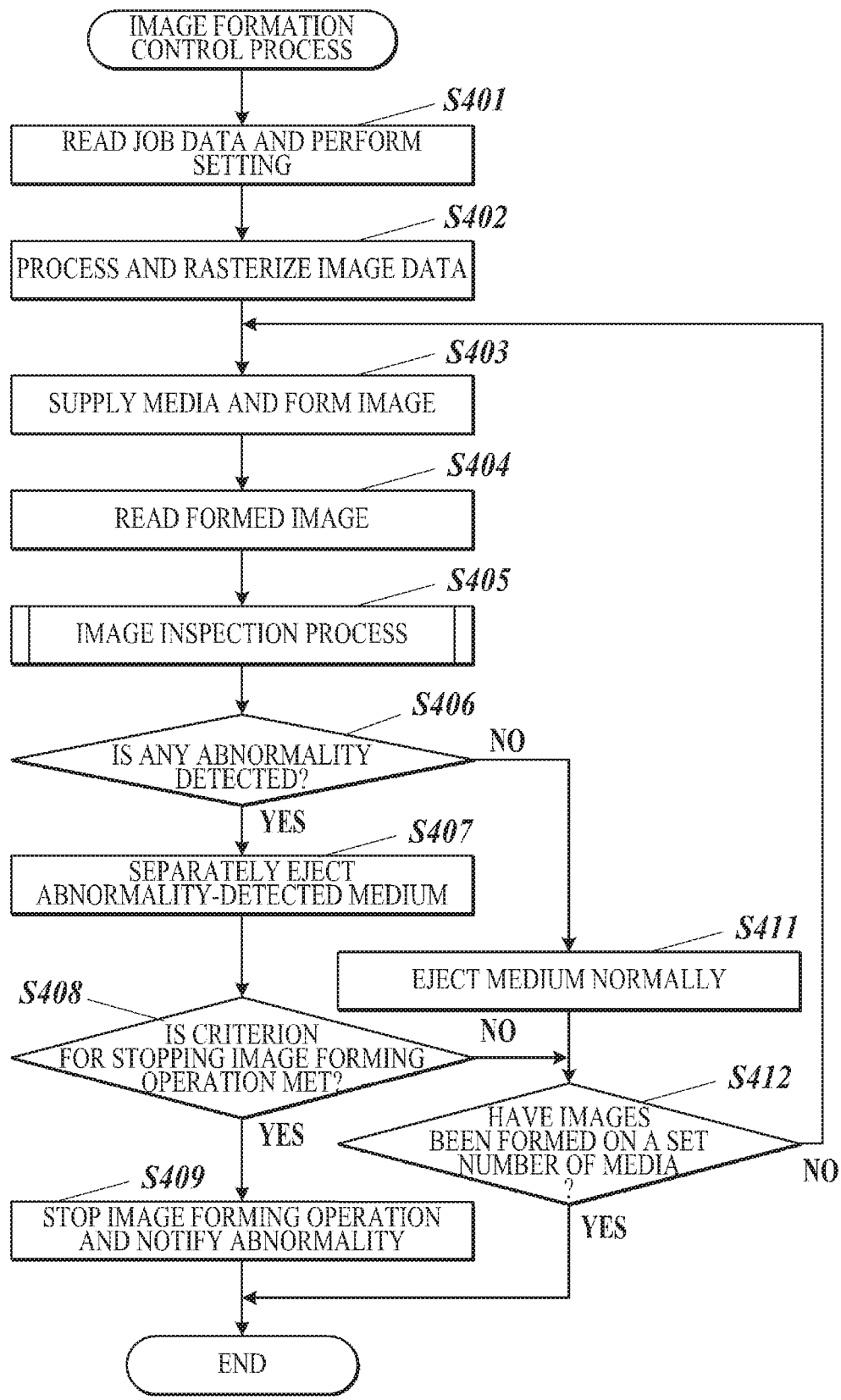
FIG. 4 is a flowchart showing control procedure of an image formation control process.

FIG. 4 is a flowchart showing procedure of an image formation control process that is controlled and executed by the controller 10 of the image forming apparatus 100 in one or more embodiments. The image formation control process starts when, for example, job data is obtained.

When the image formation control process starts, the controller 10 (CPU 11) reads job data and performs setting in accordance with setting data (Step S401). The controller 10 processes and rasterizes image data (renders image data into a bitmap) (Step S402).

The controller 10 outputs control signals to the image former 70 and causes the image former 70 to perform image forming operation on a supplied medium (media) (Step S403). The controller 10 causes the image reader 80 to image and read the image formed on the medium (Step S404).

The controller 10 calls and executes an image inspection process, which is described later (Step S405).

The controller 10 determines whether or not any abnormality is detected on the formed image or on the medium as a result of the image inspection process (Step S406). When determining that no abnormality is detected (Step S406: NO), the controller 10 causes the medium to be output normally (Step S411).

The controller 10 determines whether images have been formed on a set number of media (Step S412). When determining that images have not been formed on the set number of media yet (Step S412: NO), the controller 10 returns to Step S403. When determining that images have been formed on the set number of media (Step S412: YES), the controller 10 ends the image formation control process.

When determining that an abnormality(ies) is detected as a result of the image inspection process in Step S405 (Step S406: YES), the controller 10 ejects the medium on which the abnormality is detected separately from media on which images have been correctly formed (Step S407). The controller 10 determines whether a criterion (criteria) for stopping the image forming operation is met (Step S408). When determining that the criterion is not met (Step S408: NO), the controller 10 proceeds to Step S412. Herein, the medium that is ejected as being abnormal may be excluded in the number of image-formed media.

When determining that the criterion is met (Step S408: YES), the controller 10 stops the image forming operation and causes the display 50 or any other component capable of performing notifying operation to notify the abnormality (Step S409). The controller 10 then ends the image formation control process.

Figure 5:
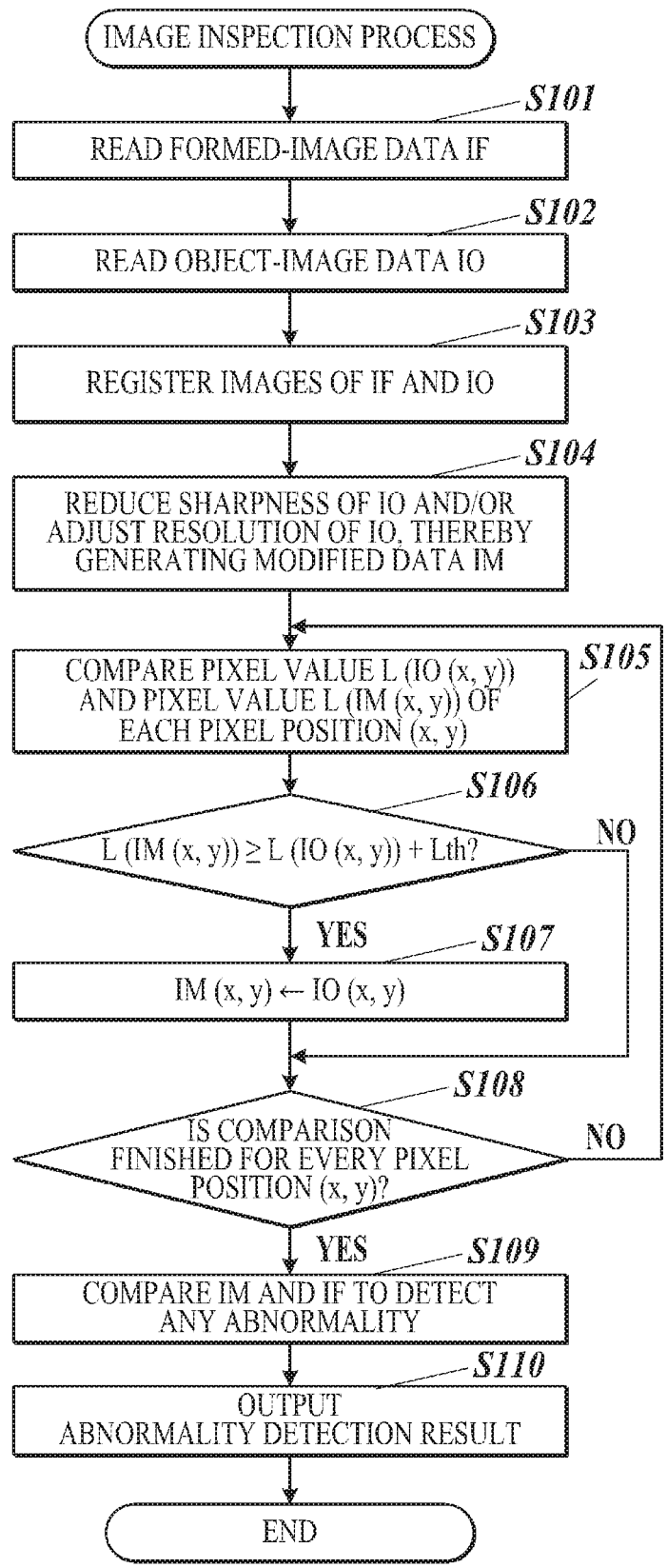
FIG. 5 is a flowchart showing control procedure of an image inspection process.

FIG. 5 is a flowchart showing procedure of the image inspection process (image inspection method in one or more embodiments) that is called in the image formation control process and controlled by the controller 10. The image inspection process may be called in response to a predetermined input operation on the operation receiver 60 and executed independently from the image formation control process.

When the image inspection process starts, the controller 10 (CPU 11) reads formed-image data IF (Step S101). When the formed image is a black-and-white image, the controller 10 may read image data of a certain wavelength range only (e.g., image data of the wavelength of R), as described above. The controller 10 reads object-image data IO (Step S102). The controller 10 registers the two images in the formed-image data IF and the object-image data IO (Step S103). The images may be registered according to a well-known method. For example, the controller 10 determines a positional relationship in which the degree of matching of the two images maximizes. The images may be relatively moved in parallel and/or rotational directions for the registration. The aspect ratio of the images may also be changed. When identical or similar images are successively formed, points for registration (registration points) are supposed to be almost the same. In such a case, the degree of matching of the images may be calculated around the initially identified registration points to register the images.

The controller 10 adjusts the resolution of the object-image data IO or applies LPF to the object-image data IO, thereby reducing high-frequency spatial changes (i.e., reducing the sharpness) of the object-image data IO. Thus, the controller 10 generates modified data IM (Step S104). When the same images are repeatedly formed and the same modified data IM can be used, the controller 10 may not repeat the process of Step S104.

The controller 10 compares pixel values of the modified data IM and the object-image data IO on a pixel position (x,y) basis (Step S105). The controller 10 determines whether or not the difference between the pixel value L (IM (x,y)) of the modified data IM and the pixel value L (IO (x,y)) of the object-image data IO is equal to or greater than the upper limit of change Lth (predetermined upper limit) (Step S106). When determining that the difference is equal to or greater than the upper limit of change Lth (Step S106: YES), the controller 10 resets the data of the pixel position (x,y) in the modified data IM to the data of the pixel positon (x,y) in the original object-image data IO (Step S107). In other words, the controller 10 undoes the modification of the pixel (part). The controller 10 then proceeds to Step S108. When determining that the difference is less than the upper limit of change Lth (Step S106: NO), the controller 10 moves to Step S108.

The controller 10 determines whether the comparison has been finished for every pixel position (x,y) (Step S108). When determining that the comparison has not been finished yet (Step S108: NO), the controller 10 changes the pixel position (x,y) and returns to Step S105.

The process from Step S104 to S108 are the adjustment step of the image inspection process in one or more embodiments.

When determining that the comparison has been finished for every pixel position (x,y) (Step S108: YES), the controller 10 compares the obtained modified data IM and the formed-image data IF and detects abnormalities in accordance with a reference upper limit (Step S109: detection step). The controller 10 outputs the results of the abnormality detection (Step S110) and ends the image inspection process.

Figure 6:
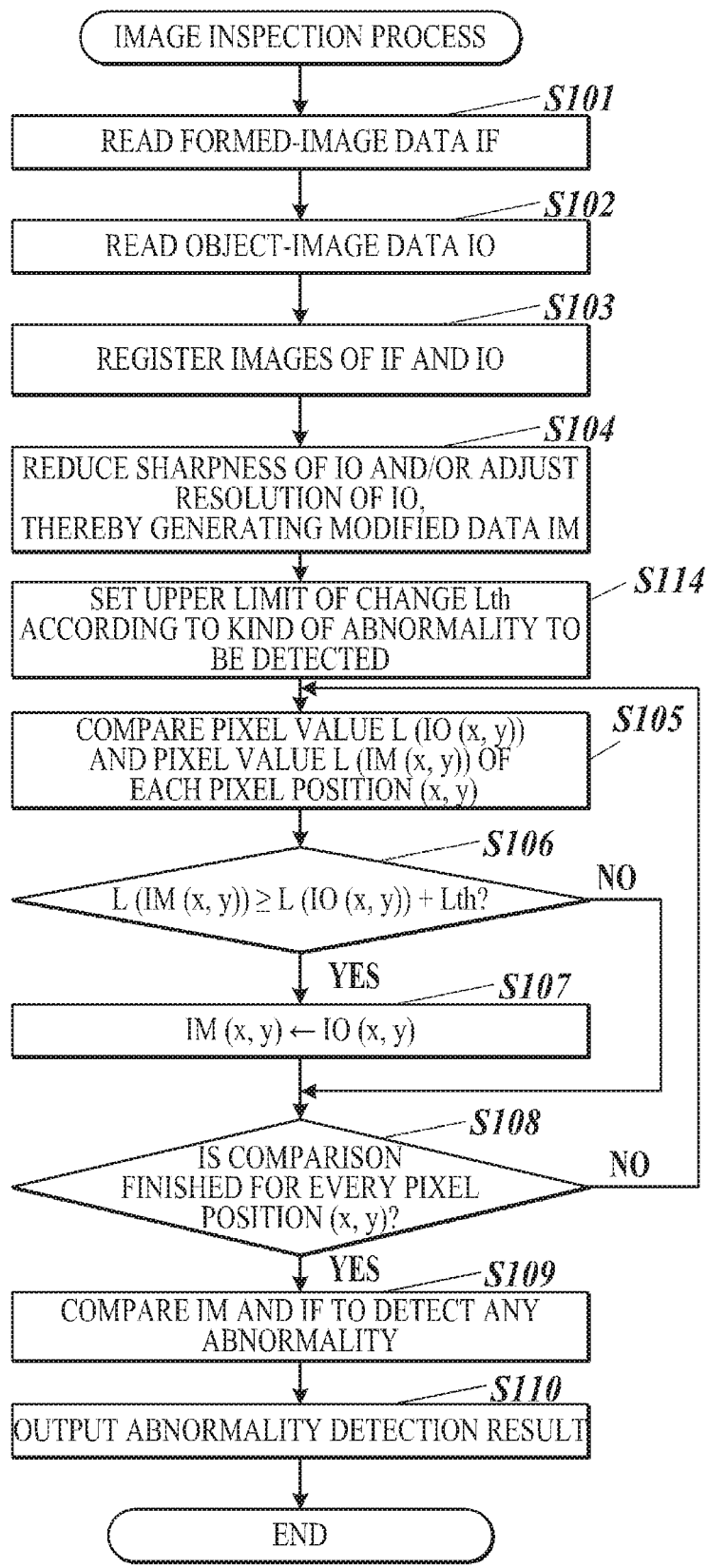
FIG. 6 is a flowchart showing a first modification of the image inspection process.

FIG. 6 is a flowchart showing a first modification of the image inspection process shown in FIG. 5.

The first modification differs from the above-described image inspection process in that Step S114 is added. The same steps have the same reference numerals, and the description thereof is omitted.

After generating the modified data IM in Step S104, the controller 10 sets an upper limit of change Lth according to the kind of the abnormality to be detected (Step S114). The controller 10 then proceeds to Step S105.

Figure 7:
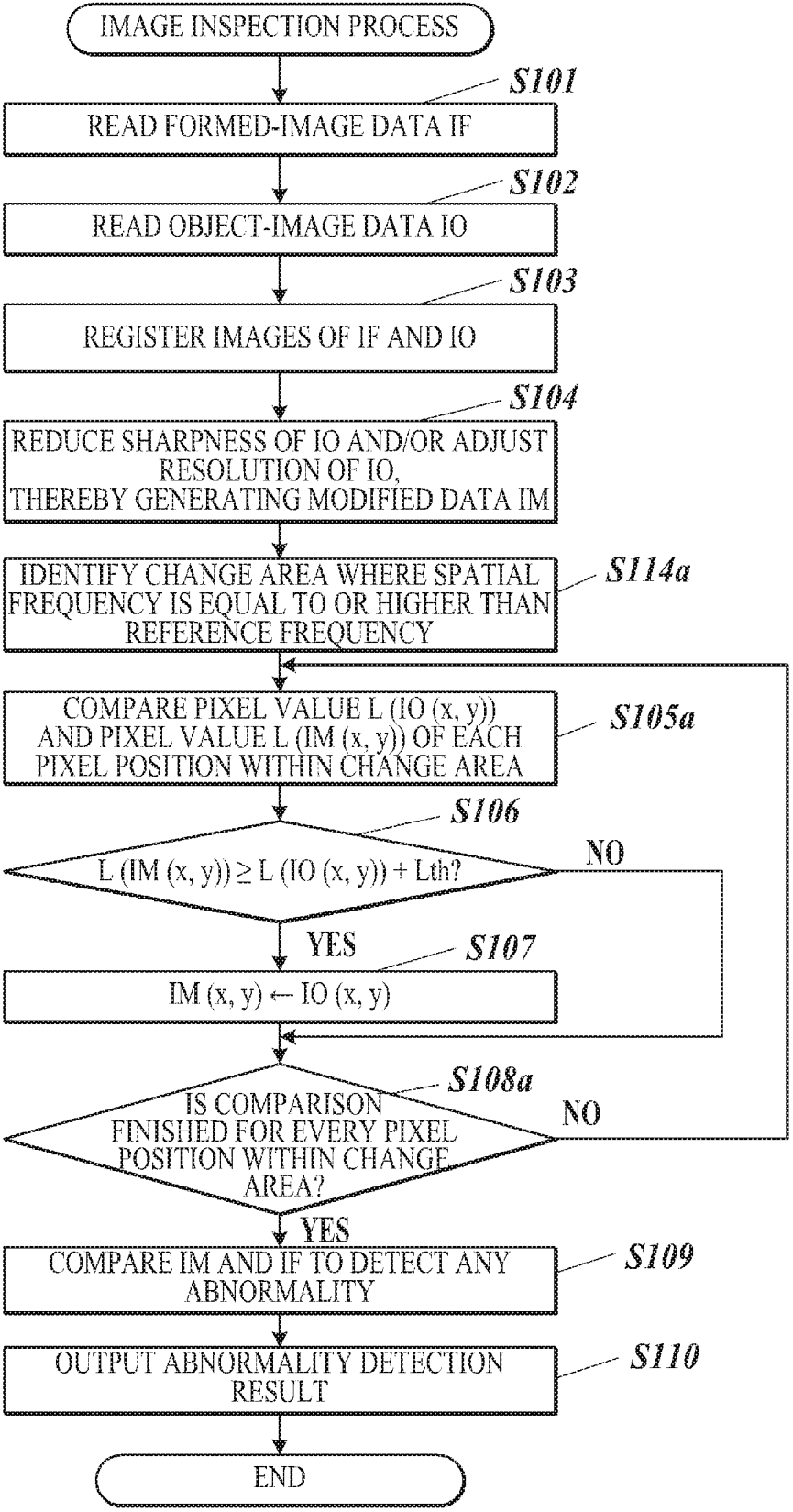
FIG. 7 is a flowchart showing a second modification of the image inspection process.

FIG. 7 is a flowchart showing a second modification of the image inspection process.

In the second modification, Steps S114, S105, and S108 in the first modification are replaced with Steps S114a, S105a, and S108a, respectively. The other steps are the same as the first modification and have the same reference numerals, and the description thereof is omitted.

After generating the modified data IM in Step S104, the controller 10 identifies, within the whole image area, a change area where (i) spatial frequencies are equal to or greater than a predetermined reference frequency and (ii) the intensity of spatial changes is equal to or greater than a reference (Step S114a). This step is for selectively identifying parts, such as edges at the border of letters, where density levels sharply change. The change area may be determined, for example, by (i) obtaining spectral intensity by performing Fourier transformation, (ii) selecting a range of predetermined high-frequency components in the obtained spectral intensity, and (iii) determining an area where the intensity of spatial changes is high in the spatial distribution. In other words, the change area may be determined so as to include an area where luminosity values change in a specific direction at a rate of change being equal to or greater than a reference rate. The change area may be determined roughly so as to include the edges and exclude an area where the process from Step S105a to S108a is not needed.

The controller 10 compares the pixel value L (IO (x,y)) and the pixel value L (IM (x,y)) of each pixel position (x,y) within the identified change area (Step S105a). The controller 10 then proceeds to Step S106.

After Step S107 or after "NO" in Step S106, the controller 10 determines whether the comparison of luminosity values (pixel values) has been finished for every pixel position (x,y) within the change area (Step S108a). When determining that the comparison has not been finished yet (Step S108a: NO), the controller 10 returns to Step S105a. When determining that the comparison has been finished (Step S108a: YES), the controller 10 proceeds to Step S109.

Figure 8:
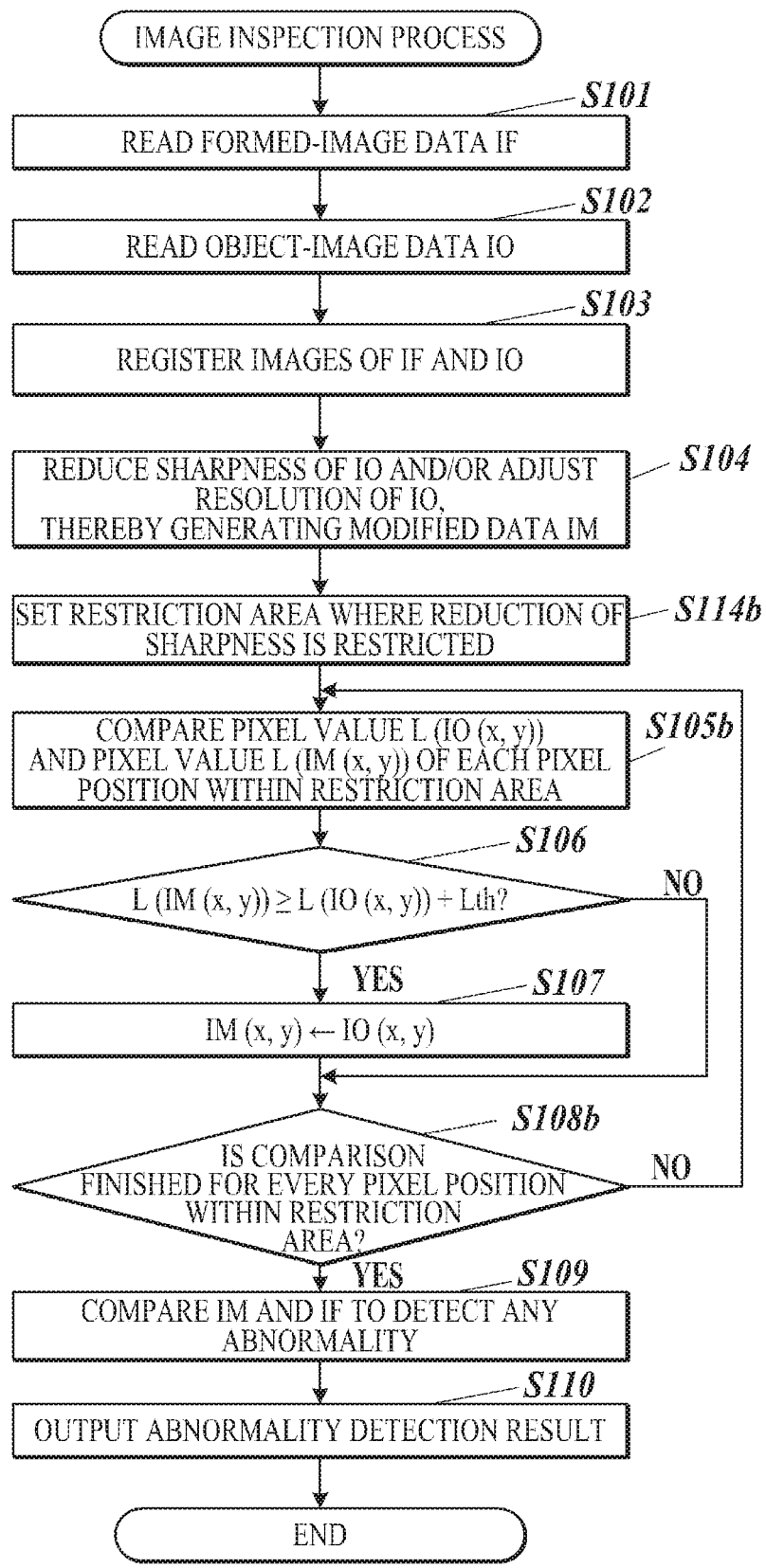
FIG. 8 is a flowchart showing a third modification of the image inspection process.

FIG. 8 is a flowchart showing a third modification of the image inspection process.

In the third modification, Steps S114, S105, and S108 in the first modification are replaced with Steps S114b, S105b, and S108b, respectively. The other steps are the same as the first modification and have the same reference numerals, and description thereof is omitted.

After generating the modified image IM in Step S104, the controller 10 sets an area (restriction area) where the modification of pixel values is restricted (Step S114b). The restriction area may be set, for example, according to input operations received by the operation receiver 60. In receiving the input operations, the display 50 may display the object-image data IO on the display screen to allow a user to circle the restriction area with a pointing device, for example.

The controller 10 compares the pixel value L(IO(x,y)) and the pixel value L(IM(x,y)) of each pixel position (x,y) within the set restriction area (Step S105b). The controller 10 then proceeds to Step S106.

After Step S107 or after "NO" in Step S106, the controller 10 determines whether the comparison of the luminosity values (pixel values) has been finished for every pixel position (x,y) within the restriction area (Step S108b). When determining that the comparison has not been finished yet (Step S108b: NO), the controller 10 returns to Step S105b. When determining that the comparison has been finished (Step S108b: YES), the controller 10 proceeds to Step S109.

Figure 9:
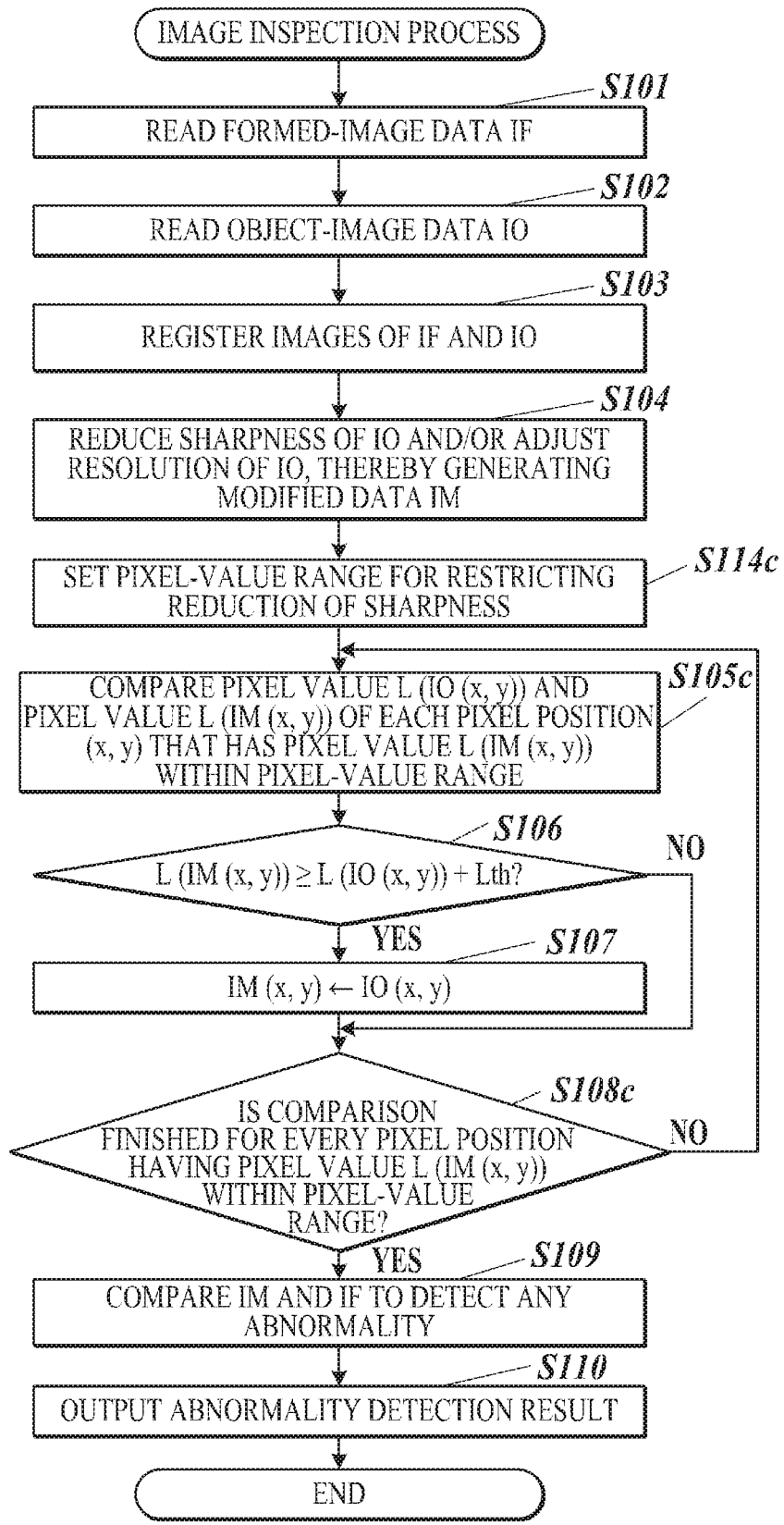
FIG. 9 is a flowchart showing a fourth modification of the image inspection process.

FIG. 9 is a flowchart showing a fourth modification of the image inspection process.

In the fourth modification, Steps S114, S105, and S108 in the first modification are replaced with Steps S114c, S105c, and S108c, respectively. The other steps are the same as the first modification and have the same reference numerals, and description thereof is omitted.

After generating the modified data IM in Step S104, the controller 10 determines, in the whole image, a range of pixel values (pixel-value range) for restricting the modification of pixel values (Step S114b). In this modification, the modification of pixel values is restricted in a part of the object-image data having low luminosity values (e.g., dark part having luminosity values equal to or lower than a reference value). This is because, if such a part is modified to have higher luminosity values, more parts in the formed-image data are wrongly detected as being abnormal in detecting abnormalities regarding luminosity decrease due to stains (abnormally dark parts). A part of the object-image data having high luminosity values (luminosity values higher than the predetermined reference value) is unlikely to cause misdetections and therefore may be excluded from the restriction. The range of pixel values may be determined, for example, according to input operations received by the operation receiver 60.

The controller 10 compares the pixel value L(IO(x,y)) and the pixel value L(IM(x,y)) of each pixel position (x,y) that has a pixel value L(IM(x,y)) within the set pixel-value range (Step S105c). The controller 10 then proceeds to Step S106.

After Step S107 or after "NO" in Step S106, the controller 10 determines whether the comparison of luminosity values (pixel values) has been finished for every pixel position (x,y) that has a pixel value L(IM(x,y)) within the pixel-value range (Step S108c). When determining that the comparison has not been finished yet (Step S108c: NO), the controller 10 returns to Step S105c. When determining that the comparison has been finished (Step S108c: YES), the controller 10 proceeds to Step S109.

Figure 10:
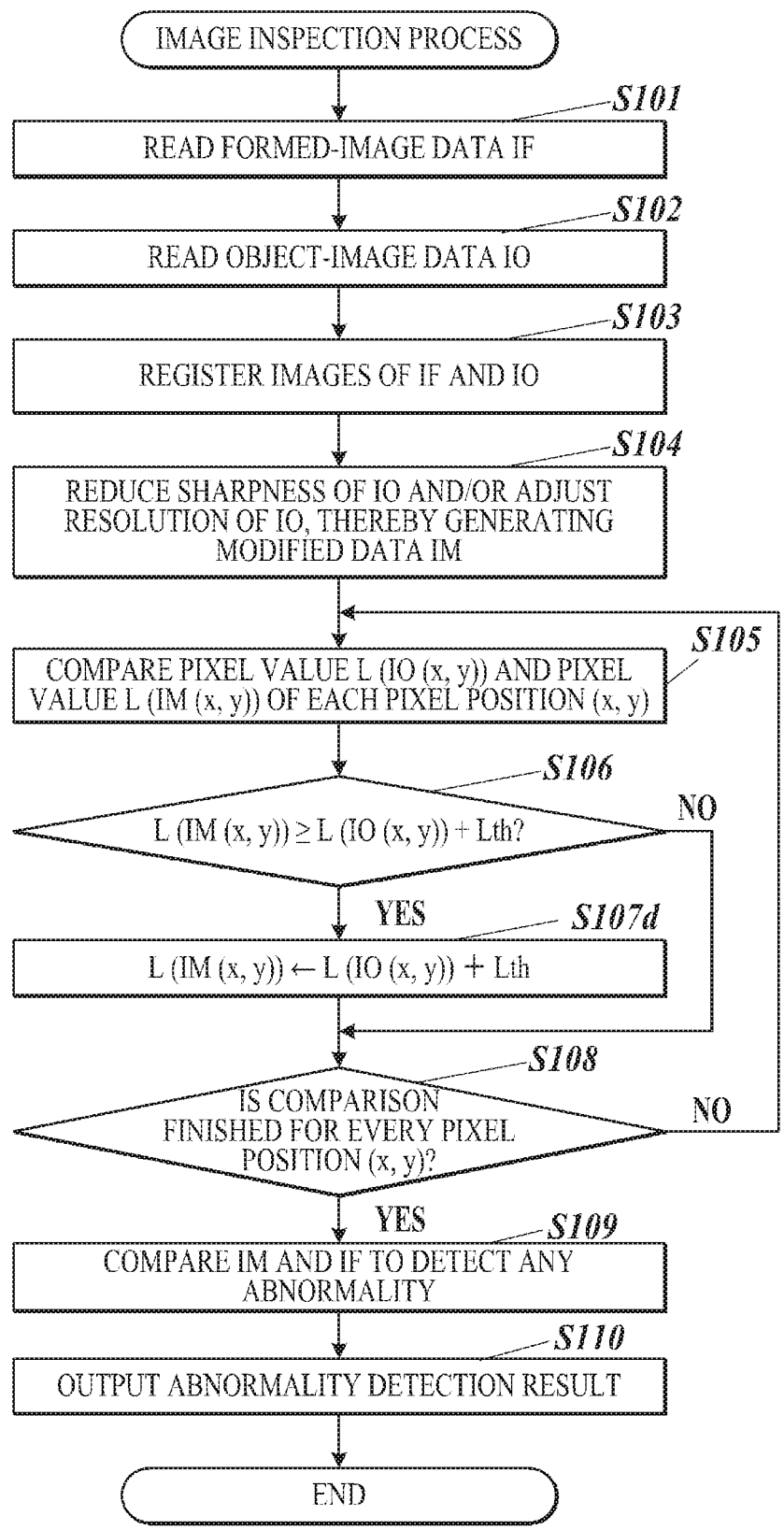
FIG. 10 is a flowchart showing a fifth modification of the image inspection process.

FIG. 10 is a flowchart showing a fifth modification of the image inspection process.

In the fifth modification, Step S107 of the image inspection process of one or more embodiments shown in FIG. 5 is replaced with Step S107d. The other steps are the same as in FIG. 5 and have the same reference numerals, and description thereof is omitted.

When determining that the luminosity value L (IM(x,y)) is higher than the luminosity value L(IO(x,y)) by the upper limit of change Lth or more (Step S106: YES), the controller 10 changes the luminosity value L (IM(x,y)) of the modified data IM to be the total of (i) the luminosity value L(IO(x,y)) of the object-image data IO and (ii) the upper limit of change Lth (Step S107d). In other words, if a luminosity value changes by the upper limit of change Lth or more after the modification (adjustment) of luminosity values, the controller 10 in the fifth modification uniformly determines the maximum value of the change amount of the luminosity value to be the upper limit of change Lth, instead of undoing the modification. The controller 10 then proceeds to Step S108.

Figure 11:
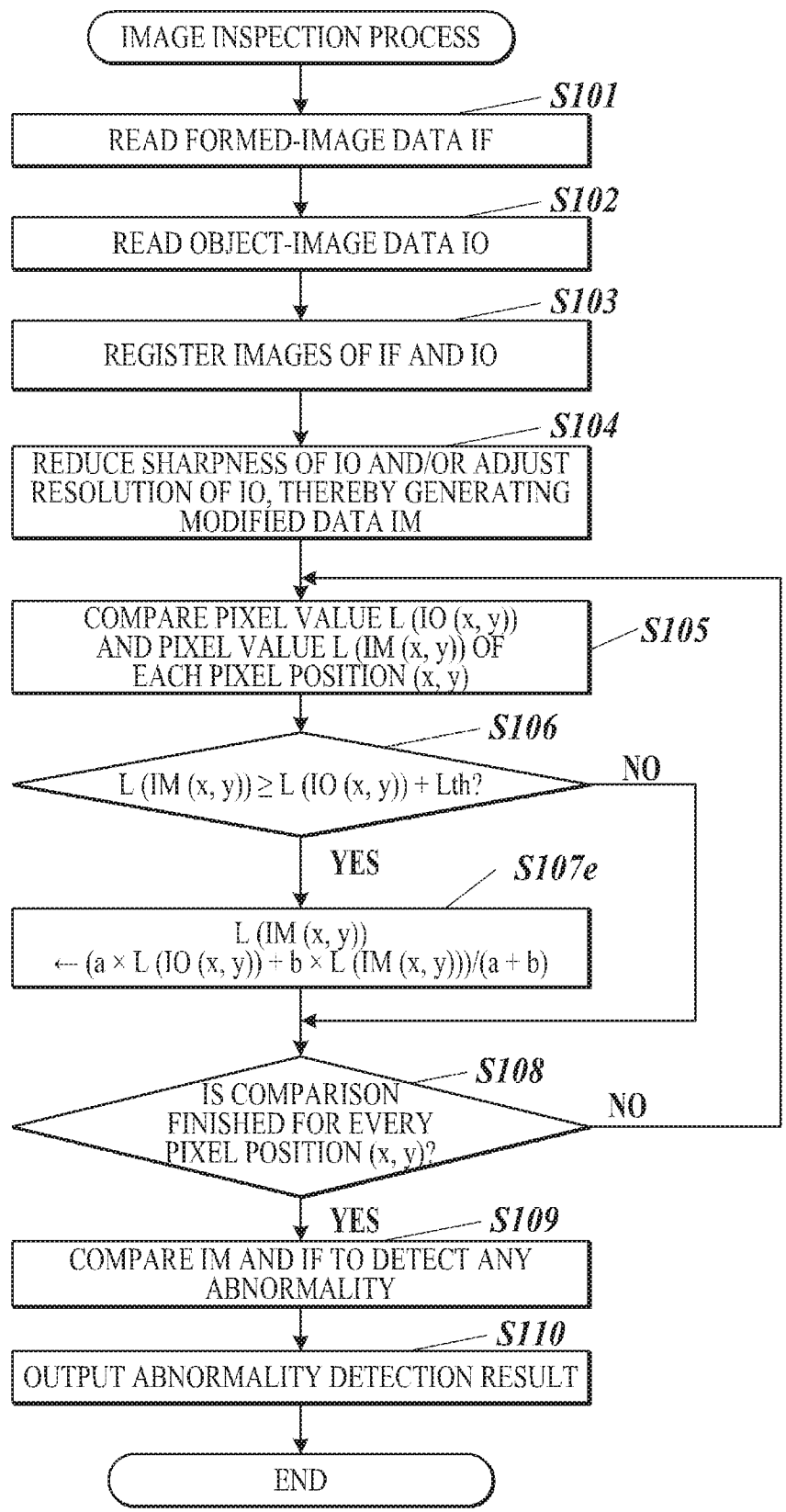
FIG. 11 is a flowchart showing a sixth modification of the image inspection process.

FIG. 11 is a flowchart showing a sixth modification of the image inspection process.

In the sixth modification, Step S107 in the image inspection process of one or more embodiments shown in FIG. 5 is replaced with Step S107e. The other steps are the same as in FIG. 5 and have the same reference numerals, and description thereof is omitted.

When determining that the luminosity value L (IM(x,y)) is higher than the luminosity value L(IO(x,y)) by the upper limit of change Lth or more (Step S106: YES), the controller 10 changes the luminosity value L(IM(x,y)) using the weighted average mean of the luminosity value L(IM(x,y)) and the luminosity value L(IO(x,y)) (Step S107e). The weighted average mean is calculated using predetermined weighting coefficients a, b. More specifically, the controller 10 calculates (a×L(IM(x,y))+b×L(IO(x,y)))/(a+b) and determines the calculation result to be the value of L(IM(x,y)). The controller 10 then proceeds to Step S108.

Step S107 in the first to fourth modifications shown in FIGS. 6 to 9 may be replaced with Step S107d or Step S107e.

When the controller 10 detects abnormalities regarding lack of color materials (abnormally light part) instead of abnormalities regarding stains, the controller 10 may undo the modification of pixel values at a part where the pixel values become excessively low after the modification in Step S106 in the image inspection process and the modifications. More specifically, the modification may be undone when L(IM(x,y))+Lth≤L(IO(x,y)) holds. In this case, the modification of pixel values is restricted in a part of the object-image data having high luminosity values (e.g., light part having luminosity values equal to or higher than a predetermined reference value). This is because, if such a part is modified to have lower luminosity values, more parts in the formed-image data are wrongly detected as being abnormal in detecting abnormalities regarding luminosity increase (abnormally light parts). A part of the object-image data having low luminosity values (luminosity values lower than the predetermined reference value) is unlikely to cause misdetections and therefore may be excluded from the restriction. Also, parts in which stains are detected and parts in which partial losses of an image are detected may be separately determined according to pixel values. In such a case, a criterion (criteria) for undoing the modification of pixel values may be selected on a pixel basis.

As described above, the image forming apparatus 100 in one or more embodiments includes the controller 10 and detects abnormalities of a formed image by comparing formed-image data (imaged data) obtained by imaging the formed image and object-image data (original image data) of the formed image. The controller 10 adjusts, as the adjuster, the object-image data so as to reduce sharpness of the original image data, and detects, as the detector, the abnormality by comparing the adjusted object-image data and the formed-image data. The controller 10 is able to partly restrict the reduction of the sharpness.

When outlines of the object image in the object-image data are simply blurred according to the actually formed image, the blurring may theoretically change density levels of a part where the density levels need not be changed. As a result, extreme luminosity values that are present locally may be reduced to insufficient values. The controller 10 can effectively restrict the reduction of sharpness in such parts, and accordingly, reduce misdetections caused by the blurring of the object image. Thus, the image forming apparatus 100 can detect abnormalities in the formed image as well as appropriately reducing misdetections.

Further, the controller 10 determines a content of the restriction according to a kind of abnormality to be detected. The kind of abnormality to be detected determines the direction of changes in density levels to be inspected, and accordingly, determines the direction of changes in density levels that may lead to misdetections and are caused by reduction of sharpness. The controller 10 determines how to restrict the reduction of sharpness, such as restriction areas and criteria, on the basis of the direction of changes in density levels that may cause misdetections. Thus, the controller 10 can effectively reduce misdetections and undetected abnormalities.

Further, in detecting a part of the formed image that is abnormally dark, the controller 10 restricts the reduction of the sharpness in a part of the object-image data that becomes light owing to the reduction of the sharpness.

In detecting abnormalities such as stains, the controller 10 restricts changes in luminosity values in parts of the object-image data, such as thin black lines that become lighter due to blurring. Even if such parts are correctly formed in the formed image, the parts may be wrongly determined as being stained by being compared with the object-image data having artificially increased luminosity values. The controller 10 can avoid such misdetections.

Further, in detecting a part of the formed image that is abnormally light, the controller 10 restricts the reduction of the sharpness in a part of the object-image data that becomes dark owing to the reduction of the sharpness.

In detecting abnormalities such as lack of applied color materials, the controller 10 restricts changes in luminosity values in parts of the object-image data, such as thin white spaces or lines that become darker due to blurring. Even if such parts are correctly formed in the formed image, the parts may be wrongly determined as lacking color materials by being compared with the object-image data having artificially decreased luminosity values. The controller 10 can avoid such misdetections.

Further, the controller 10 sets an area in the object-image data where the reduction of the sharpness is restricted. The misdetections tend to occur in specific parts, such as clear borders of an image that has extreme luminosity values at short intervals. In the other parts, reduction of sharpness does not have to be restricted. The controller 10 sets an area where the reduction of sharpness needs to be restricted. Thus, the controller 10 can omit unnecessary processes on the other areas.

Further, the image forming apparatus 100 includes the operation receiver 60 that receives an input operation being input from outside. The controller 10 adjusts, as the adjuster, the object-image data within the area received by the operation receiver 60. For example, in most cases, an area of letters in an article is easily recognizable by a user and has a simple shape. The image forming apparatus 100 allows the user to manually set an area where the reduction of sharpness needs to be restricted with the operation receiver 60. This omits processing operations for determining the area. Thus, the controller 10 can appropriately and easily detect abnormalities in each area of the image.

Further, the controller 10 sets, as the adjuster, the area where the reduction of sharpness is restricted based on a pixel value of each pixel. Changes in density levels caused by abnormalities may be inconspicuous depending on the direction of the changes and the original density levels, and hence may not cause an issue. The controller 10 determines the area where the reduction of sharpness needs to be restricted on the basis of the original pixel values. Thus, the controller 10 can avoid needlessly modifying density levels in a reverse direction and omit processing operations on areas where the reduction of sharpness need not be restricted.

Further, the controller 10 sets, as the adjuster, the area where the reduction of sharpness is restricted so that the area includes a region where luminosity values change in a specific direction at a rate of change that is equal to or greater than a reference rate. The reduction of sharpness needs to be restricted in an area of the object-image data where luminosity values change sharply (area where high spatial frequency components are strong). An image that is formed on the basis of the object-image data may not reproduce the borders as depicted in the object-image data. On the other hand, with respect to an area of the object-image data that does not have sharp changes in luminosity values, the reduction of sharpness need not be restricted. The controller 10 selects areas where high spatial frequency components are strong (areas where components of spatial frequencies equal to or higher than a predetermined reference frequency have a strength equal to or higher than a reference strength) so as to exclude areas where the reduction of sharpness need not be restricted. Thus, the controller 10 can avoid unnecessary processing operations and opposite effects.

Further, the formed-image data (imaged data) is data of a color image that is formed by combining images of different wavelength ranges, and the controller 10 adjusts the object-image data based on at least one of the images of different wavelength ranges. For example, when the formed image is a black-and-white image formed with black ink, multiple wavelength ranges of the formed image may not be read. The controller 10 uses the formed-image data of only a certain wavelength range(s) in comparing the formed-image data and the object-image data, thereby reducing unnecessary processes. Further, data of a specific wavelength range may contain noises in an area having high spatial frequency ranges. The controller 10 can detect abnormalities easily and appropriately by selecting and using data of an appropriate wavelength range.

Further, in adjusting the object-image data, the controller 10 as the adjuster limits a maximum value of an amount of change caused by the adjustment. By setting an upper limit to the maximum value of the amount of change caused by the adjustment, the controller 10 can avoid unintentional and unrealistic changes that are equal to or greater than the upper limit. Further, by setting the upper limit with the positive/negative sign, the controller 10 can avoid great changes in pixel values in a direction inconsistent with the intention of the inspection. Thus, misdetections can be easily reduced.

Further, in adjusting the object-image data, the controller 10 as the adjuster does not adjust a part of the object-image data that changes by the amount of change more than a predetermined upper limit owing to the adjustment. In other words, if the adjustment causes unintentional large changes (in a positive or negative direction), the controller 10 undoes the changes. Thus, the controller 10 can set appropriate pixel values for the modified object-image data without changing algorithms of adjustment. Thus, misdetections can be reduced.

Further, the controller 10 adjusts, as the adjuster, the object-image data by using a low-pass filter. Thus, the controller 10 can adjust the object-image data so that differences in characteristics of the original image data and the formed-image data are reflected. On the other hand, the controller 10 easily and appropriately handles above-described side effects caused by blurring. Thus, the controller 10 can effectively reduce misdetections and appropriately detect abnormalities.

Further, the controller 10 may adjust, as the adjuster, the object-image data by smoothing the object-image data. The smoothing may include conversion (reduction) of the resolution of the image. By performing smoothing instead of LPF, the controller 10 can also reduce misdetections easily that are originated from differences in characteristics of the original-image data and the formed-image data.

Further, the image forming apparatus 100 includes the controller 10 as the image inspection device and the image former 70 that forms images. Thus, the image forming apparatus 100 can easily and appropriately detect abnormalities in the image formed by the image former 70.

Further, the image inspection method in one or more embodiments includes: adjusting the object-image data so as to reduce sharpness of the object-image data; and detecting the abnormality by comparing the adjusted object-image data and the formed-image data obtained by imaging the formed image. In the adjusting, the reduction of the sharpness is able to be partly restricted.

The method can reduce misdetections that are caused by the adjustment of the object-image data, the adjustment being performed to reduce misdetections originated from differences in characteristics of the original image data and the formed-image data. The detection method can detect abnormalities of the formed image as well as appropriately reducing misdetections.

The above-described embodiments are not intended to limit the present invention and may be variously modified.

For example, although the above embodiments exemplify a case where black letters/characters are formed on a white background as an image, the present invention is not limited to this. An image that has locally high contrasts may be an image formed of a combination of any colors. On the other hand, when the image forming apparatus 100 is an apparatus that only forms monochrome images, such as black letters, the image reader 80 may not image the formed image with all wavelength ranges of R, G, and B. The image reader 80 may perform imaging with all of visible light wavelength ranges or with a specific wavelength range.

Further, in the fifth modification, the controller 10 determines a difference between the luminosity value L (IM(x,y)) and the luminosity value L (IO(x,y)) to be the upper limit of change Lth, if the difference is equal to or greater than the upper limit of change Lth. However, the difference may be uniformly determined to be a value smaller than the upper limit of change Lth.

Further, in the sixth modification, if a difference between the luminosity value L (IO(x,y)) and the luminosity value L (IM(x,y)) is equal to or higher than the upper limit of change Lth, the controller 10 modifies the difference to be the weighted average mean of L (IO(x,y)) and L (IM(x,y)) that is calculated using weighting coefficients a, b. The coefficients a, b may not be fixed numbers. The coefficients a, b may be determined such that the ratio of coefficient a to the coefficient b increases as the difference increases. In such a case, the ratio of the coefficient a to the coefficient b can be determined such that the difference as a result does not exceed the upper limit of change Lth. Changes of the ratio of the coefficient a to the coefficient b may be nonlinear with respect to the changes of the difference.

Further, the restriction of reduction in sharpness may be performed on an image other than letters. For example, when an image includes figures or graphs, parts having clear borders such as outlines of a figure or lines and points in a graph may be set as an area where the reduction of sharpness is restricted. The setting may be done automatically or manually, namely by an input operation. When the image is a photographic image including clear outlines, the part around such outlines may be set as an area where the reduction of sharpness is restricted.

Further, in the above embodiments, a user can manually set the area where the reduction of sharpness is restricted by manipulating the operation receiver 60. However, the area may be always determined automatically by the controller 10.

Further, the image forming apparatus is not limited to an apparatus that forms images electro-photographically. For example, the image forming apparatus may be an apparatus that forms an image by jetting ink to a medium, namely by ink-jet printing.

Further, in the above embodiments, the image inspection is executed by the image forming apparatus. The inspection may be executed by another computer, such as a print server, having obtained imaged data of a formed image from the image forming apparatus.

The detailed configurations and detailed processing contents and procedures shown in the above embodiments can also be appropriately modified without departing from the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image inspection device that detects an abnormality of a formed image by comparing imaged data obtained by imaging the formed image with original image data of the formed image, the image inspection device comprising a hardware processor that:
   adjusts the original image data to reduce sharpness of the original image data; and
   detects the abnormality by comparing the adjusted original image data with the obtained imaged data, wherein
   the hardware processor partly restricts the reduction of the sharpness, and
   in detecting a part of the formed image that is abnormally dark, the hardware processor restricts the reduction of the sharpness in a part of the original image data that becomes light owing to the reduction of the sharpness.

2. The image inspection device according to claim 1, wherein the hardware processor determines a content of the restriction based on a kind of the abnormality.

3. The image inspection device according to claim 2, wherein when detecting a part of the formed image that is abnormally light, the hardware processor restricts the reduction of the sharpness in a part of the original image data that becomes dark owing to the reduction of the sharpness.

4. The image inspection device according to claim 1, wherein the hardware processor sets an area in the original image data in which the reduction of the sharpness is restricted.

5. The image inspection device according to claim 4, further comprising:
   a touch screen that receives an input operation, wherein
   the hardware processor adjusts the original image data within the area set by the input operation via the touch screen.

6. The image inspection device according to claim 4, wherein the hardware processor sets the area based on a pixel value of each pixel.

7. The image inspection device according to claim 4, wherein the hardware processor sets the area that includes a region where a luminosity value changes in a specific direction at a change rate equal to or greater than a reference rate.

8. The image inspection device according to claim 1, wherein
   the obtained imaged data is data of a color image formed by combining images of different wavelength ranges, and the hardware processor adjusts the original image data based on at least one of the images of different wavelength ranges.

9. The image inspection device according to claim 1, wherein when adjusting the original image data, the hardware processor limits a maximum value of a change caused by the adjustment.

10. The image inspection device according to claim 1, wherein when adjusting the original image data, the hardware processor does not adjust a part of the original image data that changes by an amount more than a predetermined upper limit owing to the adjustment.

11. The image inspection device according to claim 1, wherein the hardware processor adjusts the original image data using a low-pass filter.

12. The image inspection device according to claim 1, wherein the hardware processor adjusts the original image data by smoothing the original image data.

13. An image forming apparatus comprising:
the image inspection device according to claim 1; and
an image former that forms an image.

14. An image inspection method for detecting an abnormality of a formed image by comparing imaged data obtained by imaging the formed image with original image data of the formed image, the image inspection method comprising:
adjusting the original image data to reduce sharpness of the original image data; and
detecting the abnormality by comparing the adjusted original image data with the obtained imaged data, wherein
the adjusting includes partly restricting the reduction of the sharpness, and
the adjusting includes at least either one of;
(i) in detecting a part of the formed image that is abnormally dark, the hardware processor restricts the reduction of the sharpness in a part of the original image data that becomes light owing to the reduction of the sharpness, and
(ii) in detecting a part of the formed image that is abnormally light, the hardware processor restricts the reduction of the sharpness in a part of the original image data that becomes dark owing to the reduction of the sharpness.

15. An image inspection device that detects an abnormality of a formed image by comparing imaged data obtained by imaging the formed image with original image data of the formed image, the image inspection device comprising a hardware processor that:
adjusts the original image data to reduce sharpness of the original image data; and
detects the abnormality by comparing the adjusted original image data with the obtained imaged data, wherein
the hardware processor partly restricts the reduction of the sharpness, and
in detecting a part of the formed image that is abnormally light, the hardware processor restricts the reduction of the sharpness in a part of the original image data that becomes dark owing to the reduction of the sharpness.

* * * * *